US010891156B1

(12) United States Patent
Zhao et al.

(10) Patent No.: US 10,891,156 B1
(45) Date of Patent: Jan. 12, 2021

(54) INTELLIGENT DATA COORDINATION FOR ACCELERATED COMPUTING IN CLOUD ENVIRONMENT

(71) Applicant: EMC IP Holding Company LLC, Hopkinton, MA (US)

(72) Inventors: Junping Zhao, Beijing (CN); Yifan Sun, Abington, MA (US); Layne Peng, Shanghai (CN); Jie Bao, Shanghai (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 282 days.

(21) Appl. No.: 15/498,055

(22) Filed: Apr. 26, 2017

(51) Int. Cl.
*G06F 9/48* (2006.01)
*G06F 9/50* (2006.01)
(52) U.S. Cl.
CPC .......... *G06F 9/4881* (2013.01); *G06F 9/5005* (2013.01)
(58) Field of Classification Search
None
See application file for complete search history.

(56) References Cited

U.S. PATENT DOCUMENTS

| 9,672,064 B2* | 6/2017 | Gupta ................. G06F 9/5044 |
| 9,959,142 B2* | 5/2018 | Hsu ..................... G06F 9/5044 |
| 2010/0088490 A1* | 4/2010 | Chakradhar ............. G06F 8/45 712/34 |
| 2010/0223213 A1* | 9/2010 | Su ......................... G06N 20/00 706/12 |
| 2012/0124591 A1* | 5/2012 | Cadambi ................ G06F 9/505 718/103 |
| 2013/0185433 A1* | 7/2013 | Zhu ..................... H04L 43/0882 709/226 |
| 2013/0191612 A1* | 7/2013 | Li ......................... G06T 15/005 712/30 |
| 2014/0289733 A1* | 9/2014 | Fritz ..................... G06F 9/5066 718/104 |
| 2015/0205637 A1* | 7/2015 | Lee ....................... G06F 9/505 718/105 |
| 2015/0324441 A1* | 11/2015 | Zhou ...................... G06T 1/20 707/737 |
| 2015/0379429 A1* | 12/2015 | Lee ........................ G06N 20/00 706/11 |

(Continued)

OTHER PUBLICATIONS

Belviranli, Mehmet E., et al. "Cumas: Data transfer aware multi-application scheduling for shared gpus." Jun. 1, 2016. Proceedings of the 2016 International Conference on Supercomputing. ACM. (Year: 2016).*

(Continued)

*Primary Examiner* — Lewis A Bullock, Jr.
*Assistant Examiner* — Gilles R Kepnang
(74) *Attorney, Agent, or Firm* — Ryan, Mason & Lewis, LLP

(57) ABSTRACT

Systems and methods are provided to implement intelligent data coordination for accelerated computing in a distributed computing environment. For example, a method includes executing a task on a computing node, monitoring requests issued by the executing task, intercepting requests issued by the executing task which correspond to data flow operations to be performed as part of the task execution, and asynchronously executing the intercepted requests at scheduled times to coordinate data flow between resources on the computing node.

20 Claims, 5 Drawing Sheets

(56) References Cited

U.S. PATENT DOCUMENTS

| | | | | |
|---|---|---|---|---|
| 2016/0055612 | A1* | 2/2016 | Barik | G06T 1/20 345/522 |
| 2016/0266930 | A1* | 9/2016 | Jones | G06Q 10/06311 |
| 2016/0321776 | A1* | 11/2016 | Zou | G06T 1/20 |
| 2017/0017521 | A1* | 1/2017 | Gupta | G06F 9/4881 |
| 2017/0269964 | A1* | 9/2017 | Ashbaugh | G06F 9/4881 |
| 2018/0183660 | A1* | 6/2018 | Byers | H04L 41/147 |

OTHER PUBLICATIONS

Chen, Jieyang, et al. "GreenLA: green linear algebra software for GPU-accelerated heterogeneous computing." 2016. IEEE. SC'16: Proceedings of the International Conference for High Performance Computing, Networking, Storage and Analysis. (Year: 2016).*

Wang, Kaibo. "Algorithmic and Software System Support to Accelerate Data Processing in CPU-GPU Hybrid Computing Environments". 2015. The Ohio State University. (Year: 2015).*

Wen, Yuan et al. "Smart multi-task scheduling for OpenCL programs on CPU/GPU heterogeneous platforms." 2014 21st International Conference on High Performance Computing (HiPC). IEEE, 2014. (Year: 2014).*

Ukidave, Yash et al. "Mystic: Predictive scheduling for gpu based cloud servers using machine learning." 2016 IEEE International Parallel and Distributed Processing Symposium (IPDPS). IEEE, 2016. (Year: 2016).*

Basaran, Can et al. "Supporting preemptive task executions and memory copies in GPGPUs." 2012. 24th Euromicro Conference on Real-Time Systems. IEEE. (Year: 2012).*

Abadi, M. et al. 2016. Tensorflow: Large-scale machine learning on heterogeneous distributed systems. arXiv preprint arXiv: 1603. 04467. (Year: 2016).*

"Seven Service Providers Delivering the GPU-Accelerated Cloud—Built on NVIDIA Grid: Delivering GPU-Accelerated Desktops and Apps, from any Cloud," https://blogs.nvidia.com/blog/2016/09/27/the-gpu-accelerated-cloud/, Sep. 27, 2016, 5 pages.

"Linux Accelerated Computing Instances," http://docs.aws.amazon.com/AWSEC2/latest/UserGuide/accelerated-computing-instances.html, Apr. 11, 2017, 7 pages.

Tiffany Trader, "Microsoft Puts GPU Boosters on Azure Cloud," https://www.hpcwire.com/2015/09/29/microwoft-puts-gpu-boosters-on-azure-cloud/, Sep. 29, 2015, 15 pages.

NVIDIA Corporation, "NDVIDIA 'Tesla' P100: GPU Acclerator," Tesla P100, Data Sheet, Oct. 2016, 2 pages.

NVIDIA Corporation, "NVIDIA DGX-1 for Analytics: AI-Accelerated Analytics and Interactive Visualization," Data Analytics, Solution Brief, Dec. 2016, 4 pages.

Kazunori Sato, "Machine Intelligence at Google Scale: TensorFlow and Cloud Machine Learning," Google, Jul. 13, 2016, 45 pages.

H. Cui et al., "GeePS: Scalable Deep Learning on Distributed GPUs with a GPU-Specialized Parameter Server," Proceedings of the Eleventh European Conference on Computer Systems (EuroSys), Apr. 18-21, 2016, 17 pages, Article No. 4.

G. Diamos et al., "Persistent RNNs: Stashing Recurrent Weights On-Chip," Proceedings of the 33rd International Conference on Machine Learning, Jun. 30, 2016, 10 pages.

* cited by examiner

INTELLIGENT DATA COORDINATION FOR ACCELERATED COMPUTING IN CLOUD ENVIRONMENT

FIELD

This disclosure relates generally to techniques for accelerated data processing in a distributed or cloud computing environment.

BACKGROUND

Various types of special-purpose processors, such as graphics processing units (GPUs) for general purpose computing and other types of hardware accelerators, have been developed for accelerated processing of specific types of workloads. The processing capabilities of GPU devices and other types of hardware accelerators are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning (ML), deep learning (DL), data mining, video data transcoding, image analysis, image recognition, virus pattern matching, augmented reality, encryption/decryption, weather forecasting, big data analytics and comparisons, and other applications with computational workloads that have an inherently parallel nature.

A distributed computing environment which comprises a large scale of shared computing resources over a cluster of computing nodes is typically utilized to support emerging applications such as big data analytics and deep learning applications. Indeed, deep learning applications, for example, require the collection and processing of a significantly large amount of data, wherein the data includes training data to build and optimize deep learning models, as well as model parameters of the deep learning models which are utilized for inference processing. Implementing an efficient distributed computing environment for these types of applications is not trivial as the intensive computational workloads, and the massive volume of data that must be communicated, streamed, prefetched, and coordinated between the shared computing resources of the distributed computing platform presents a significant challenge and practical limit on system performance and scalability.

SUMMARY

Illustrative embodiments of the invention generally include systems and methods for implementing intelligent data coordination for accelerated computing in a distributed computing environment. For example, one embodiment includes a method which comprises executing a task on a computing node, monitoring requests issued by the executing task, intercepting requests issued by the executing task which correspond to data flow operations to be performed as part of the task execution, and asynchronously executing the intercepted requests at scheduled times to coordinate data flow between resources on the computing node.

Other embodiments of the invention include, without limitation, systems and articles of manufacture comprising processor-readable storage media.

DETAILED DESCRIPTION

Illustrative embodiments of the invention will now be explained in further detail with regard to systems and methods for implementing intelligent data coordination for accelerated computing in a distributed computing environment. Embodiments of the invention provide multiple solutions to support intelligent data coordination between shared resources of a distributed computing system which is configured to provide accelerated processing services for HPC applications such as big data analytics and machine learning (e.g., deep learning). Intelligent data coordination techniques according to embodiments of the invention are designed to optimize the performance of distributed computing systems that execute compute intensive jobs such as big data analytics and large machine learning problems, which require a significant use of computing resources (e.g., processor, memory, storage, and networking resources), and which require the communication of large amounts of data over a network or an internal system buss between computing nodes and computing resources.

Figure 1:
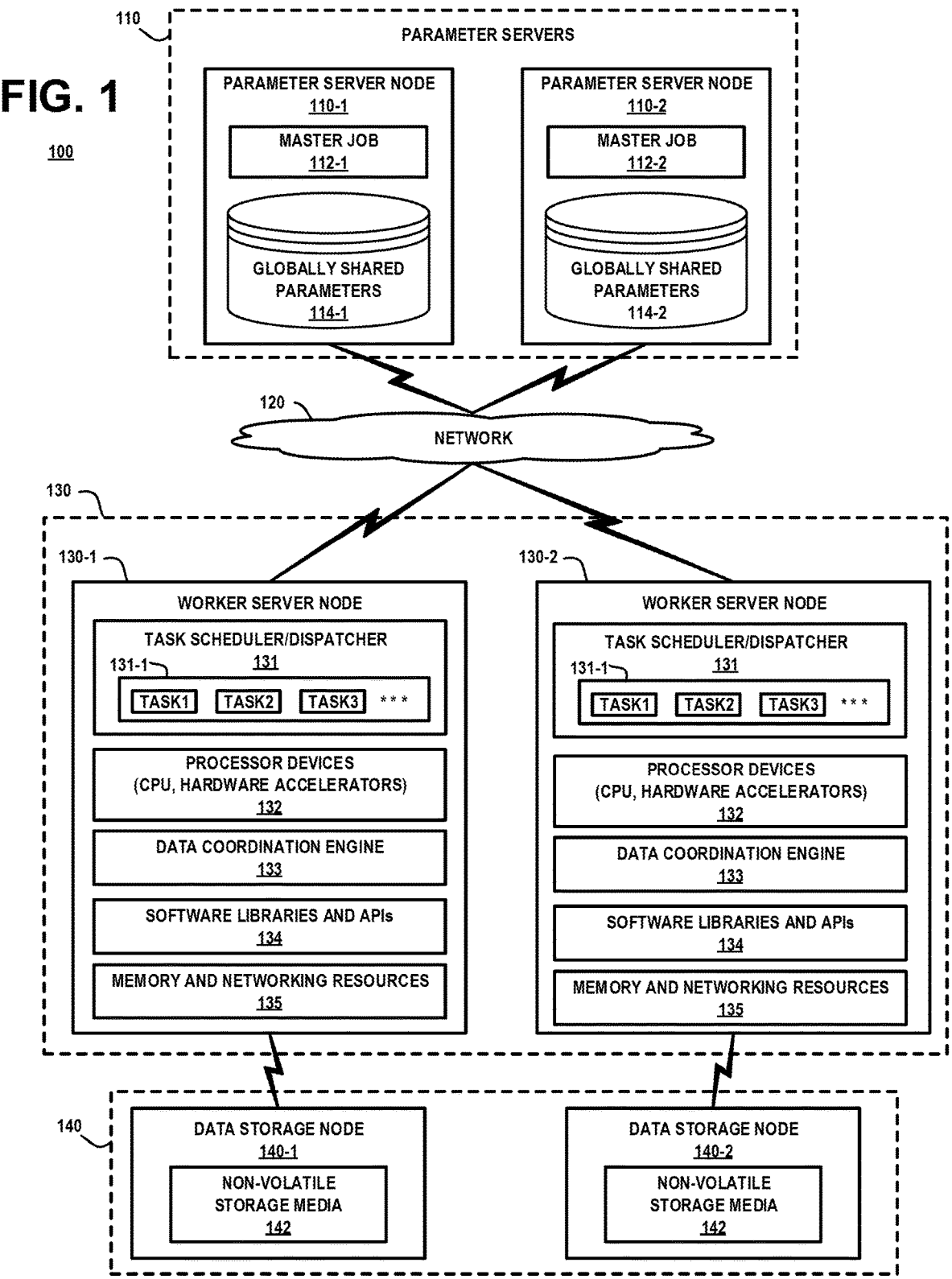
FIG. 1 is a high-level schematic illustration of a computing system which implements intelligent data coordination for accelerated computing over shared resources in a distributed environment, according to an embodiment of the invention.

FIG. 1 is a high-level schematic illustration of a computing system 100 which provides intelligent data coordination for accelerated computing over shared resources in a distributed environment, according to an embodiment of the invention. The computing system 100 comprises a plurality of parameter server nodes 110-1 and 110-2 (collectively referred to as parameter server nodes 110), a communications network 120, a plurality of worker server nodes 130-1 and 130-2 (collectively referred to as worker server nodes 130), and a plurality of data storage nodes 140-1 and 140-2 (collectively referred to as data storage nodes 140). The worker server nodes 130 in FIG. 1 represent physical server machines, virtual machines, and/or containers.

The communications network 120 may comprise any known communication network such as, a global computer network (e.g., the Internet), a wide area network (WAN), a local area network (LAN), a satellite network, a cable network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 120 in some embodiments comprises a combination of multiple different types of communications networks each comprising network devices configured to communicate using Internet Protocol (IP) or other related communication protocols. The network 120 comprises intermediate points (such as routers, switches, etc.) and other elements that form a network backbone to establish communication paths and enable communication between network endpoints.

The data storage nodes 140-1 and 140-2 each comprise non-volatile storage media 142 to provide persistent storage resources for the respective worker server nodes 130-1 and 130-2 (e.g., to store training data used for deep learning applications). The non-volatile storage media 142 may include one or more different types of persistent storage devices such as hard disk drives (HDDs) or solid-state drives (SSDs), or other types and combinations of non-volatile memory. In one embodiment, the data storage nodes 140 are implemented using, for example, an enterprise-class storage platform comprising high performance, scalable storage arrays, which can be implemented for hyper-scale computing systems. While FIG. 1 shows the data storage nodes 140-1 and 140-2 coupled to respective worker server nodes 130-1 and 130-2, the data storage nodes 140-1 and 140-2 may be part of a data storage system, or a combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure.

The computing system 100 schematically illustrates a parameter server framework in which the parameter server nodes 110-1 and 110-2 host and manage respective master jobs 112-1 and 112-2, and respective globally shared parameters 114-1 and 114-2 for distributed accelerated computing (e.g., deep learning, etc.) over the worker server nodes 130. The master jobs 112-1 112-2 may be different jobs, or partitions of the same master job that is managed in a distributed matter over the parameter server nodes 110. The worker server nodes 130-1 and 130-2 each comprise a task scheduler and dispatcher module 131, processor devices 132, a data coordination engine 133, software libraries and application programming interfaces (APIs) 134, and memory and networking resources 135.

The task scheduler and dispatcher module 131 comprises a task queue 131-1 to enqueue pending tasks that are assigned to the worker server nodes 130 by the parameter server nodes 110. The processor devices 132 include central processing units (CPUs) and hardware accelerator devices such as GPUs, and other workload-optimized processors that are implemented to execute the assigned tasks for a target application (e.g., application specific integrated circuits such as tensor processing units (TPUs) developed for machine learning, etc.). The memory and networking resources 135 include memory devices such as dynamic random access memory (DRAM), non-volatile RAM (NVRAM), NVM Express (NVMe) enabled non-volatile storage media, etc., and network controllers such as network cards and resources to support communication protocols and interfaces such as Peripheral Component Interconnect Express (PCIe), direct memory access (DMA) and remote DMA (RDMA) data transfer protocols, etc.

The software libraries and APIs 134 comprise pre-written code, classes, procedures, scripts, configuration data, etc., which can be called or otherwise utilized by the executing tasks to implement specific functions, or otherwise access or communicate with the memory and networking resources 135 and computing resources (e.g., processor devices 132). The software libraries and APIs 134 may implement commercially available library and/or API platforms such CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. Other commercially available libraries and APIs that may be used for machine learning and deep learning applications include, by way of example, the Intel® Math Kernel Library (MKL) (which is a math library for accelerated math processing and neural network routines), the NVIDIA CUDA® Deep Neural Network library (cuDNN) (which is a GPU-accelerated library of primitives for deep neural networks), Infiniband (TB) verbs for RDMA applications, Message Passing Interface (MPI) (which is a message passing API platform to support parallel computing, NCCL (pronounced "Nickel") (which is a library of multi-GPU collective communication primitives), etc.

In one embodiment, the data coordination engine 133 comprises a software layer that is disposed in a data path between the tasks executing on the processor devices 132 and the software libraries and APIs 134, which interact with underlying shared computing, memory, storage, networking resources. The data coordination engine 133 is configured to intelligently and efficiently optimize data flow and communication between local processor devices (e.g., GPU↔GPU, GPU↔CPU) and between local processor and memory devices (e.g., GPU↔NVRAM) on a given worker server node 130 (intra-node data communication), or between local and remote processor/memory resources (inter-node data communication) residing on a given worker server node and a remote node (e.g., parameter server node, or data storage node, etc.).

As explained in further detail below, the data coordination engine 133 is configured to monitor requests issued by an executing task, intercept requests issued by the executing task which correspond to data flow operations to be performed as part of the task execution, and asynchronously execute the intercepted requests at scheduled times to coordinate data flow between local resources on the given worker server node (or between local resources and remote resources on a remote node). For example, requests related to data flow operations comprise memory allocation requests, I/O operations, data communication, data prefetch operations, batch data loading operations, data feeding/exchange operations, etc.

In particular, the requests include system call APIs such as memory allocation requests, or data access/copy/movement requests for transferring data from "host-to-device" or from 37 device-to-host, wherein the device can be a GPU or DMA-enabled non-volatile memory device, and wherein the host refers to a CPU, for example. The data coordination engine 133 can either immediately execute an intercepted request, or enqueue the intercepted request in a request queue for asynchronous execution as a later time. Essentially, the data coordination engine operates in a data plane as an I/O scheduler for computing tasks to provide intelligent coordination of data flow both intra-node and inter-node to optimize the data flow in the distributed system in a way that mitigates blocking and bottlenecking, and improves overall system throughput. For example, if multiple concurrent tasks (e.g., machine learning tasks) are executing on a given worker server node and computing (GPU, CPU, etc.) memory, and networking resources, there may be a situation where two or more of the executing tasks sharing a given GPU device are aggressively preloading data from CPU to GPU, wherein the internal bus can be overloaded and the device memory inefficiently used. In this instance, intelligent data flow scheduling and coordination can be applied to manage the preloading and processing of data for the two or more executing tasks in a way that prevents blocking and enhances throughput.

The use of intelligent data coordination for distributed machine learning or deep learning applications is particularly advantageous as such applications require the collection, processing, and communication, of a significantly large amount of data, wherein the data includes training data to build and optimize deep learning models, as well as model parameters of the deep learning models which are utilized for inference processing. In particular, deep learning methods are configured to build models by extracting high-level, complex abstractions as data representations through a hierarchical learning process which requires a massive amount of computing that can last for hours, days or weeks. The complex abstractions are learned at a given level based on relatively less complex abstractions formulated in a preceding level in the hierarchy. The deep learning methods are used to analyze and learn patterns from massive amounts of training data that is stored in the data storage nodes 140 and accessed by the worker server nodes 130 as needed. The amount of training data that is used for a given deep learning application can be in the range of terabytes (TBs) to petabytes (PBs). The iterative processing of such a large amount of data requires a significant amount of computing and data communication resources.

As noted above, the computing system 100 schematically illustrates a parameter server framework in which the parameter server nodes 110-1 and 110-2 host and manage respective master jobs 112-1 and 112-2, and respective globally shared parameters 114-1 and 114-2 for distributed accelerated computing (e.g., deep learning, etc.) over the worker server nodes 130. The parameter server framework of FIG. 1 supports accelerated computing for distributed machine learning problems, wherein the data and machine learning workloads (which are associated with the master jobs 112-1 and 112-2) are distributed over worker server nodes 130, and wherein the worker server nodes 130 can access the globally shared parameters 114-1 and 114-2 on the parameter nodes 110. The globally shared parameters 114-1 and 114-2 represent the model parameters (e.g., dense/sparse vectors, weights, etc.) that are computed by worker server nodes 130 during a training phase, and aggregated/combined/synchronized by the parameter server nodes 110. In one embodiment, the parameter server nodes 110 maintain respective portions of the globally shared parameters 114-1 and 114-2, and communicate with each other to aggregate the model parameters and perform other management operations. Each worker server node 130 can store and process a local portion of the training data to compute local model parameters, and communicate with the parameter server nodes 110 to update and retrieve the globally shared model parameters.

The computing system of FIG. 1 can implement parallel processing across the worker server nodes 130 for deep learning application using data parallelism and/or model parallelism programming models. With data parallelism, each worker server node 130 has access to a complete copy of a given deep learning model, but each worker server node 130 operates on a different portion of the overall dataset, wherein the computation results from each worker server node 130 are combined by the parameter server nodes 110. For neural networks, data parallelism involves each executing thread using the same weights (model parameters), but with each executing thread processing different mini-batches of data, wherein processing results (e.g., gradients) are synchronized (e.g., averaged) after each processing iteration of a mini-batch dataset.

On the other hand, with model parallelism, the given model (parameter set) is split among different worker server nodes 130, wherein the executing tasks on each of the worker server nodes 130 operate on different portions of the model (e.g. different model layers) using the same mini-batch dataset. For example, each layer in a neural network can be assigned to a different worker server node, so that each worker server node performs computations in different portions of the same model. The processing results from each worker server node are communicated to the parameter servers wherein the processing results are synchronized to update the globally shared parameters 114-1 and 114-2.

In view of the above, the execution of deep learning tasks on the worker server nodes 130 involves multiple deep learning tasks concurrently running on shared hardware resources on a given worker server node. In addition, a massive amount of training data can reside in some shared persistent and reliable storage resources such as HDFS, or a shared folder (e.g., NFS (network file system)) mounted to the worker server nodes 130. In addition, deep learning training is a compute intensive task that keeps loading mini-batch samples on the worker server nodes, and performing repeated iterations (forward and back-propagation) on the mini-batch dataset using computing resources (on GPU, CPU or others) until error conditions are met. In this regard, for deep learning applications, the data coordination engines 133 that reside on the worker server nodes 130 can build the intelligence for coordinated data communication between local resources on the worker server nodes, as well as with remote nodes, by exploiting various factors that are common for deep learning type workloads in a shared resource computing environment.

By way of example, a given computing job typically involves various internal phases such as data preparation (initial data feeding, intermediate result exchange, etc.), computing, and synchronization. Datasets involved in these phases usually reside in, or are generated at, different medias/locations with different access performance, for example at GPU memory, CPU memory, local storage, remote CPU/GPU memory or remote storage. In addition, deep learning models such as convolutional neural networks (CNNs) and recurrent neural networks (RNNs) typically have a significant amount of model parameters (weights), but given a specific model layer or sparse dataset, a subset of weights can be updated, which indicates a data locality/affinity that can be learned/collected, and then leveraged by a data coordination engine to intelligently manage and coordinate data operations such as data prefetch and batch loading, etc.

Figure 2:
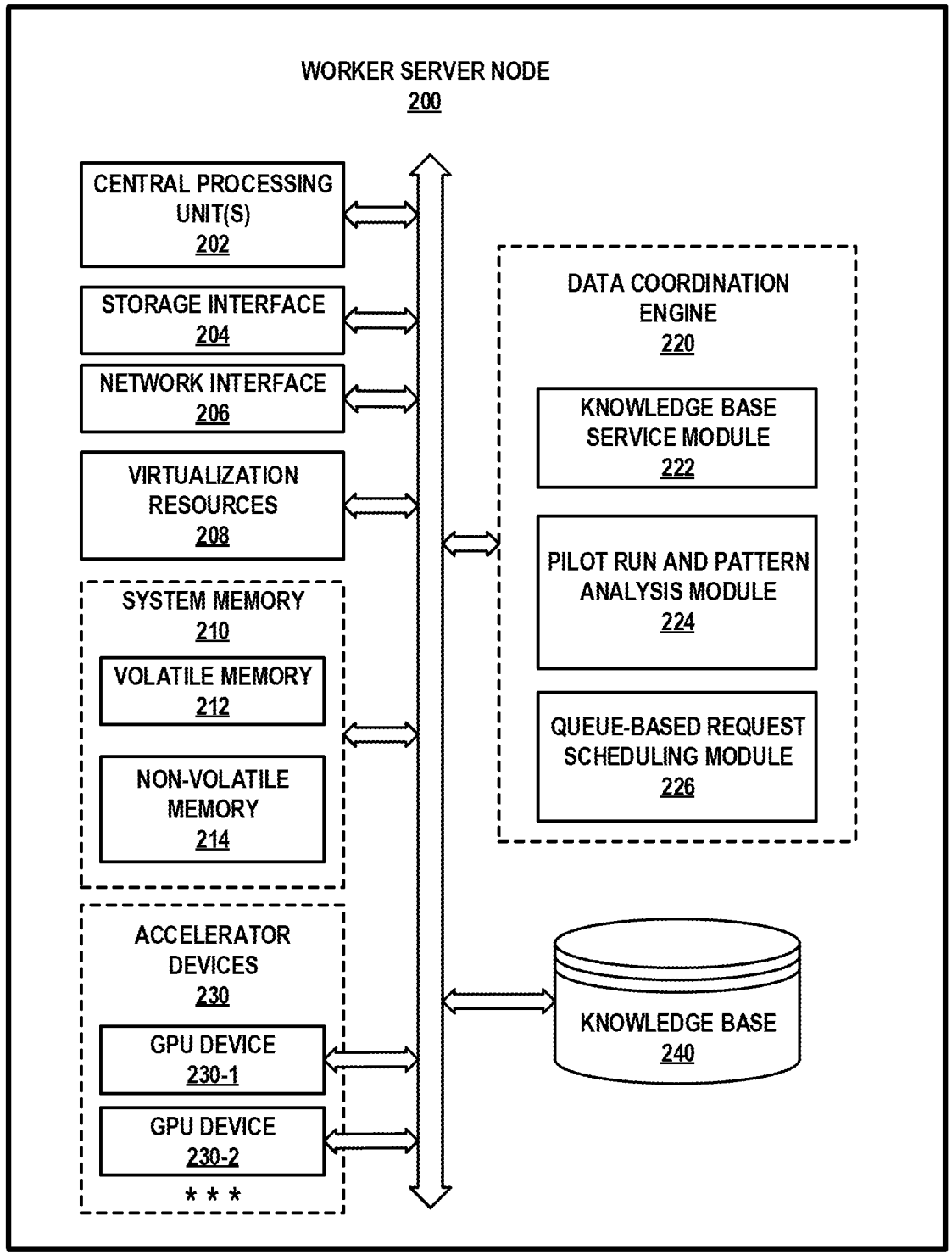
FIG. 2 schematically illustrates an embodiment of a worker server node which can be implemented in the computing system of FIG. 1, according to an embodiment of the invention.

FIG. 2 schematically illustrates an embodiment of a worker server node 200 which can be implemented in the computing system of FIG. 1, according to an embodiment of the invention. The worker server node 200 comprises one or more central processing units 202, storage interface circuitry 204, network interface circuitry 206, virtualization resources 208, system memory 210, a data coordination engine 220, accelerator devices 230, and a knowledge base 240. The system memory 210 comprises volatile memory 212 and non-volatile memory 214. The accelerator devices 230 include GPU devices 230-1 and 230-2 and other possible types of hardware accelerator devices.

The data coordination engine 220 comprises a knowledge base service module 222, a pilot run and pattern analysis module 224, and a queue-based request scheduling module 226. The various modules 222, 224, and 226 of the data coordination engine 220 represent different mechanisms to support intelligent data coordination and scheduling of data flow operations for, e.g., deep learning-type workloads in a shared resource environment. In particular, the various modules 222, 224, and 226 present alternative techniques that can be used by a data coordination engine 220 to make intelligent decisions with regard to coordinating data flow operations such as prefetching data from a memory, batch loading data into a memory, copying data from a first memory to a second memory, communicating data over an internal system bus between local resources or to remote resources on a remote node, etc.

The knowledge base service module 222 implements methods to perform offline profiling and using pre-built models that can be exported by a user. The pilot run and pattern analysis module 224 implements methods for performing pilot runs to determine data access and communication patterns/profiles that are used to make intelligent data coordination decisions. The queue-based request scheduling module 226 implements methods for enqueuing intercepted requests and utilizing request statistics/context in conjunction with the knowledge of current resource usage and availability to make intelligent data coordination decisions. The knowledge base 240 maintains profile information regarding data and model parameter (e.g., weights) access patterns, for example, which can be utilized and re-used by the modules 222 and 224 of the data coordination engine 220. The knowledge base 240 may comprise multiple versions. The knowledge base 240 may comprise a database of information that is temporarily stored in-memory (e.g., DRAM) or persistently stored in a persistent memory device such as a NVRAM. The modules 222, 224, and 226 of the data coordination engine 220 implement methods which will be discussed in further detail with reference to FIG. 4.

In one embodiment, the data coordination engine 220 and associated modules 222, 224, 226 comprise software modules that are persistently stored in a storage device. The system modules 220, 222, 224, 226 are loaded into system memory resources (e.g., the volatile memory 212 and/or non-volatile memory 214), and executed by the central processing unit(s) 202 to perform various functions as described herein. In this regard, the system memory 210 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The central processing units 202 comprise one or more multicore processors that are configured to process program instructions and data to execute a native operating system (OS) and applications that run on the worker server node 200. In other embodiments, central processing unit(s) 202 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 204 enables the central processing unit 202 to interface and communicate with the system memory 210, a data storage node (e.g., data storage node 140, FIG. 1), and other local storage and off-infrastructure storage media on the worker server node 200 or on a data storage node, using one or more standard communication and/or storage control protocols to read data from, or write data to, volatile and non-volatile memory/storage devices. The network interface circuitry 206 enables the worker server node 200 to interface and communicate with a network and other system components. The network interface circuitry 206 may comprise conventional transceivers of a type well known in the art (e.g., network interface cards, I/O adaptors, etc.).

The virtualization resources 208 can be instantiated to execute one or more applications or functions which are hosted by the worker server node 200. For example, in one embodiment, the virtualization resources 208 comprise virtual machines that are implemented using a hypervisor platform which executes on the worker server node 200, wherein one or more virtual machines can be instantiated to execute functions of the worker server node 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the worker server node 200, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the worker server node 200. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 210 comprises electronic storage media such as RAM, read-only memory (ROM), or other types of memory, in any combination. The term "memory" or "system memory" as used herein refers to volatile and/or non-volatile memory which is utilized to store application program instructions that are read and processed by the central processing units 202 (or accelerator devices 230) to execute a native operating system and one or more applications hosted by the worker server node 200, and to temporarily store data that is utilized and/or generated by the native OS and application programs running on the worker server node 200. For example, the volatile memory 212 of the system memory 210 may be a dynamic random-access memory or other forms of volatile RAM. The non-volatile memory 214 may comprise a storage-class memory (SCM) that is accessible as a memory resource. For example, the non-volatile memory 214 may be a NAND Flash storage device, a SSD storage device, or other types of next generation non-volatile memory (NGNVM) devices.

Figure 3:
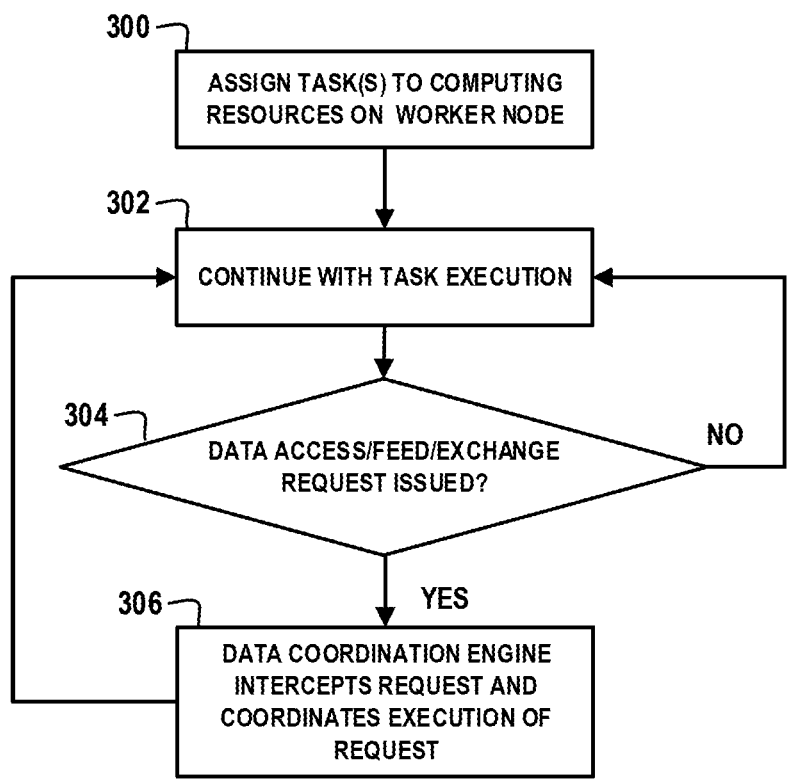
FIG. 3 is a high-level flow diagram of a method for executing tasks using a data coordination engine according to an embodiment of the invention.

FIG. 3 is a high-level flow diagram of a method for executing tasks using a data coordination engine, according to an embodiment of the invention. For illustrative purposes, the workflow of FIG. 3 will be discussed in the context of the computing system of FIG. 1. As noted above, the parameter server nodes 110 will manage the execution of a master job (e.g., training a deep learning model) by assigning tasks and data across the worker server nodes 130, which are associated with the master job to be executed. On a given worker server node, the task scheduler/dispatcher module 131 will assign local computing resources to a given task, and schedule a time for executing the given task on the worker server node using the assigned computing resources (block 300). The local computing resources may include, for example, the accelerator devices 230 (e.g., GPU devices), memory, etc. The task scheduler/dispatcher module 131 will dispatch a given task for execution by one or more local processor devices (e.g., CPU and/or GPU) at the scheduled time to continue with execution of the given task (block 302). For example, for a deep learning training task, the initial phase of task execution may include preparing a set of training samples for a learning process.

During task execution, the data coordination engine 133 will monitor commands and requests that are issued by the tasks executing on the processors. As noted above, the data coordination engine 133 on the given worker server node comprises a software layer that is disposed in a data path between the executing tasks (being executed by the processor devices 132) and the software libraries and APIs 134 which are utilized by the processor devices to interact with shared computing, memory, storage, networking resources on the worker server node. The data coordination engine 133 is configured to identify and intercept incoming requests from executing tasks which correspond to, or otherwise results in, data flow operations such as data access, feeding, and exchanging operations, memory allocation commands, data I/O operations, etc.

For example, during execution of a given task on a CPU, compute-intensive portions or routines (e.g., compute kernels) which are included within the program may be off-loaded to a GPU device for accelerated computing by the CPU issuing a GPU API request to a GPU library (e.g., CUDA). In this case, relevant data will have to be fed to a GPU device for processing, and such data feeding will be managed and coordinated by the data coordination engine 133. In addition, such requests include system call APIs such as memory allocation, or data access, data copy, and/or data movement operations such as "host-to-device" or "device-to-host" data transfer requests. As noted above, the data coordination engine 133 is configured to coordinate intra-node data movement between processing and/or memory resources on a given worker server node, or inter-node data movement from local processing or memory resources on the given worker server node, to remote processing or memory resources reside on a remote worker server node.

When the data coordination engine 133 determines that a request has been issued which corresponds to, or otherwise results in, a data flow operation (affirmative determination block 304), the data coordination engine 133 will intercept such request and intelligently coordinate the execution of such request in a way that optimizes system throughput and performance (block 306). For example, the data coordination engine 133 may determine that the request can be immediately executed under the current resource usage and allocation. Alternatively, the data coordination engine 133 can enqueue the request, and then asynchronously execute the request at some later time in coordination with other pending requests. For example, a "host-to-device" request may be issued to send data to a GPU device, but if the GPU device is too busy, or if the bandwidth of an internal data bus (e.g., PCIe bus) is overloaded, the data can be internally staged to an NVRAM device, and then subsequently transferred to the GPU device when the GPU is ready, or when data traffic on the system bus decreases, etc. By way of further example, during execution of a given task, intermediate results that are generated by a local CPU or hardware accelerator such as a GPU may need to be transferred to another local and/or remote CPU or GPU, or local or remote memory device (e.g., NVMe, NVDIMM, etc.). In all instances, the data feed and data exchange requests are managed and coordinated by the data coordination engine 133, wherein the data may be loaded or transmitted immediately, or wherein such requests are enqueued and dispatched at a later time by asynchronous background threads.

As discussed above, a data coordination engine can implement one or more techniques for making intelligent data coordination decisions. For example, the data coordination engine 220 shown in FIG. 2 provides an example embodiment in which data coordination and execution can be implemented using one or more of the knowledge base service module 222, the pilot run and pattern analysis module 224, and/or the queue-based request scheduling module 226. These data coordination techniques will now be discussed in further detail with reference to FIG. 4, which illustrates three alternative workflows 400, 410 and 420 for data coordination and execution. In the example embodiment of FIG. 4, the workflow 400 illustrates a method that is implemented by the knowledge base service module 222, according to an embodiment of the invention. The workflow 410 illustrates a method that is implemented by the pilot run and pattern analysis module 224, according to an embodiment of the invention. The workflow 420 illustrates a method that is implemented by the queue-based request scheduling module 226, according to an embodiment of the invention.

The workflow 400 is based, in part, on performing offline processing (block 402) to build models, determine model parameters using training data, determine data access patterns, determine data/model parameter locality, etc., wherein the offline processing results are stored in the knowledge base 240, and subsequently utilized for intelligent data coordination. For example, for machine learning applications, offline processing can be performed to build and train one or more different types of models such as CNN (convolutional neural network) models, RNN (recurrent neural network) models, LSTM (long short-term memory) models, etc. A set of training data can be applied to these models to collect and update model weights, and determine data access patterns, data/weight locality, etc., and then maintain such information as a built-in knowledge base (e.g. maintain model type, parameter configuration, weight locality group per network layer, etc.).

With the pre-built models and associated knowledge base, the models can be exposed as a service (block 404). For a given machine learning task that is being executed by the parameter and worker server nodes, a user can select one of the pre-built models that are exposed as a service, and execute the machine learning task using the selected model and associated knowledge base information (block 406). The associated knowledge base information is utilized by the data coordination engine to make intelligent data coordination decisions (block 408). In this embodiment, the knowledge base 240 provides a good source of relevant information that can be exported to perform a machine learning task (e.g., training or inference) and shared between different users.

Figure 4:
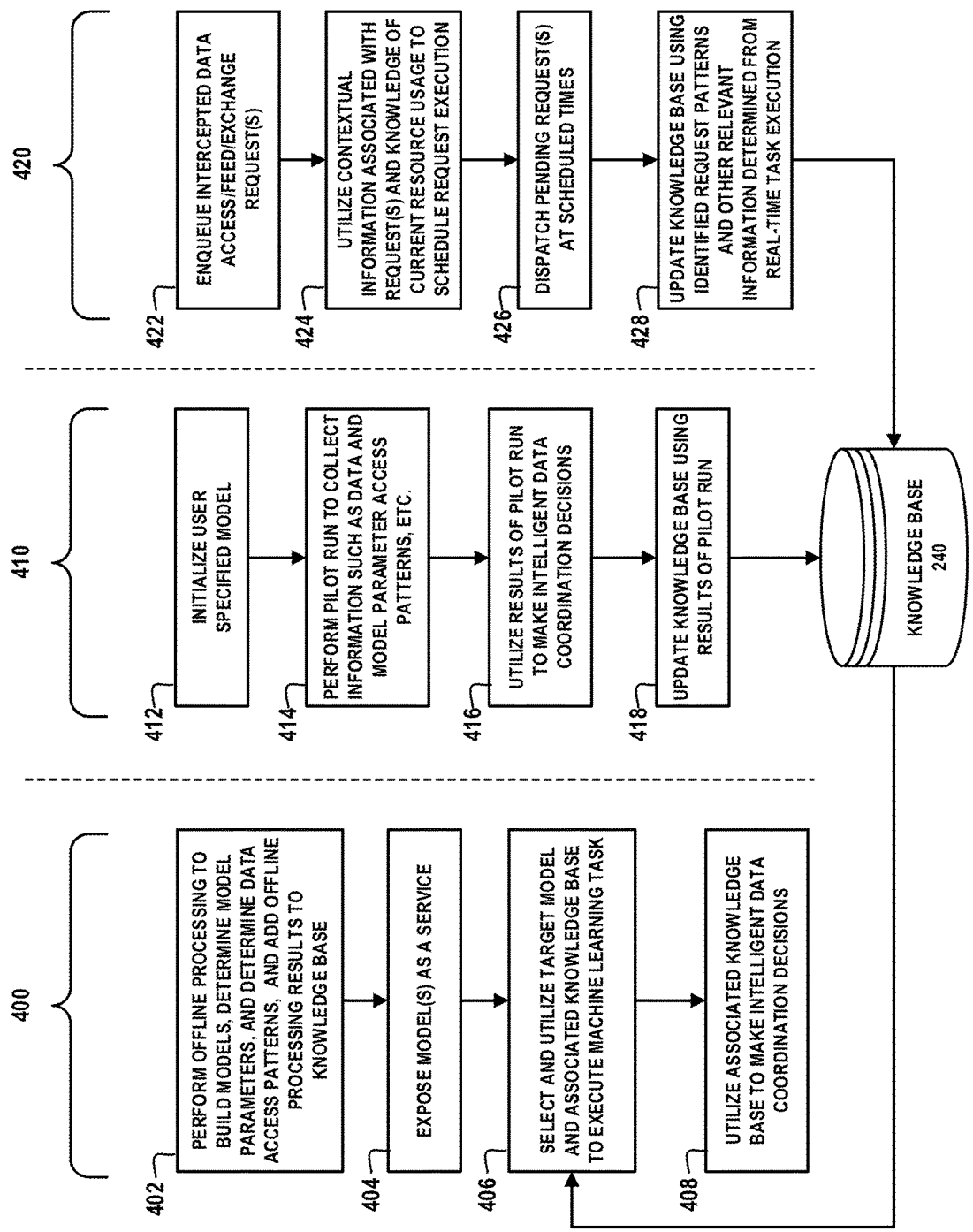
FIG. 4 illustrates various methods that can be implemented by a data coordination engine to implement intelligent data coordination according to alternative embodiments of the invention.

Next, the workflow 410 of FIG. 4 is based, in part, on performing a pilot run and obtaining profile information during the pilot run, which is utilized to make intelligent data coordination decision and to update the knowledge base 240 for reuse and sharing of the profile information. More specifically, a user-specified model is initialized (block 412), and a "pilot run" mode is commenced in which the computing system starts a machine learning training task by feeding a small amount of training samples to the user-specified model to collect information such as model parameter/weight locality, data access patterns, etc. (block 414). The results of the pilot run (e.g., profiled data, weight access pattern, etc.) are utilized by the data coordination engine to make intelligent data coordination decisions (block 416). In addition, the results of the pilot run can be incorporated as part of the knowledge base 240 or otherwise utilized to update associated information within the knowledge base 240 (block 418). As noted above, the knowledge base 240 may comprise a database of information that is temporarily stored in-memory (e.g., DRAM) or persistently stored in a persistent memory device such as a NVRAM.

Furthermore, the workflow 420 of FIG. 4 is based, in part, on a queue-based statistics and request handling scheme which is implemented by a data coordination engine. During task execution, the data coordination engine will intercept and enqueue requests which correspond to data access/feed/exchange operations in a request queue that is managed by the data coordination engine (block 422). Each intercepted request comprises associated contextual information such as, for example, the source processing device (e.g., CPU, GPU, etc.) and operational code (e.g., host-to-device-memory-copy, device-to-host-memory-copy, device-to-device-memory-copy, etc.). In addition, the data coordination engine will have knowledge of the overall resource usage and availability of computing resources on the given worker server node (e.g., GPU device workload, GPU memory usage, CPU memory usage, etc.). The data coordination engine will utilize the contextual information associated with the intercepted requests, in conjunction with the knowledge of the current resource usage and availability, to schedule the execution of pending requests in a coordinated manner (block 424), and then dispatch the pending requests according to their scheduled times to execute asynchronous data flow operations (block 426).

The workflow 420 of FIG. 4 illustrates an example embodiment in which the data coordination engine utilizes a request queue service to micro-manage the scheduling and dispatching of intercepted requests at proper times, so as to coordinate asynchronous data movement operations to and from specific processing devices and/or memory devices (e.g., batch loading of data into GPU memory, prefetching data from memory/storage, etc.) to optimize task execution and enhance system throughput. The data coordination engine can update the knowledge base 240 using identified request patterns and other relevant information that is determined during real-time task execution (block 428).

It is to be understood that the example workflows 400, 410, and 420 of FIG. 4 can be independently implemented by a data coordination engine. In another embodiment, some or all of the workflows 400, 410, and 420 can be concurrently implemented and utilized in conjunction with each other depending on the application, since each workflow 400, 410 and 420 essentially supports intelligent data coordination functionalities at different phases (offline, pre-run, online). For example, as noted above, the knowledge base 240 can be updated with knowledge that is obtained during a pilot run mode, and then re-used during another round of training (offline or real-time), and then exported and shared as service. The knowledge base 240 maintains information including, but not limited to, model type/name, model version information, running parameters, weight locality information per model layer, owner/tenant information, tag information which provides customized labels or comments, etc.

In view of the above methodologies, it is to be understood that a data coordination engine can intelligently coordinate data flow and communication (e.g., data loading, data prefetching, data exchange, etc.) between local computing resources (e.g., processors, memory) on a given worker server node using, for example, asynchronous background threads. By way of example, a data coordination engine can intelligently coordinate preloading of data (e.g., training datasets) or parameters (e.g., model weights) into memory (e.g., host memory, GPU memory, etc.) based on information within the knowledge base or contextual information of pending requests that are enqueued in a request queue. In addition, the data coordination engine can intelligently coordinate the batch loading of data or parameters into a target location based on information within the knowledge base or contextual information (e.g., source/target information) associated with pending requests, etc. The data coordination engine can asynchronously load or move data in the background using an optimal number of background threads, or otherwise control the amount of data to load into memory at a given time, to thereby manage and coordinate resource usage. The data coordination engine can re-schedule the execution order of pending request to, e.g., balance the workload of GPU devices and prevent overloading of a given GPU device.

Further, the data coordination engine can intelligently coordinate data movement (intra-node or inter-node) in a pipeline fashion, especially for remote data access operations. For example, the data coordination engine can coordinate various phases of data movement which include (i) preloading data from a remote node (e.g. remote worker server node) and staging the data into a local file system or NVRAM devices, and then (ii) DMA loading or copying the data into a GPU memory for processing by a GPU device. In one embodiment, data movement operations are performed using DMA operations for local data movement between GPU devices or between an NVMe and GPU on a given node, or RDMA operations for inter-node data movement between, for example, a computing resources or memory resources located on different worker server nodes.

Figure 5:
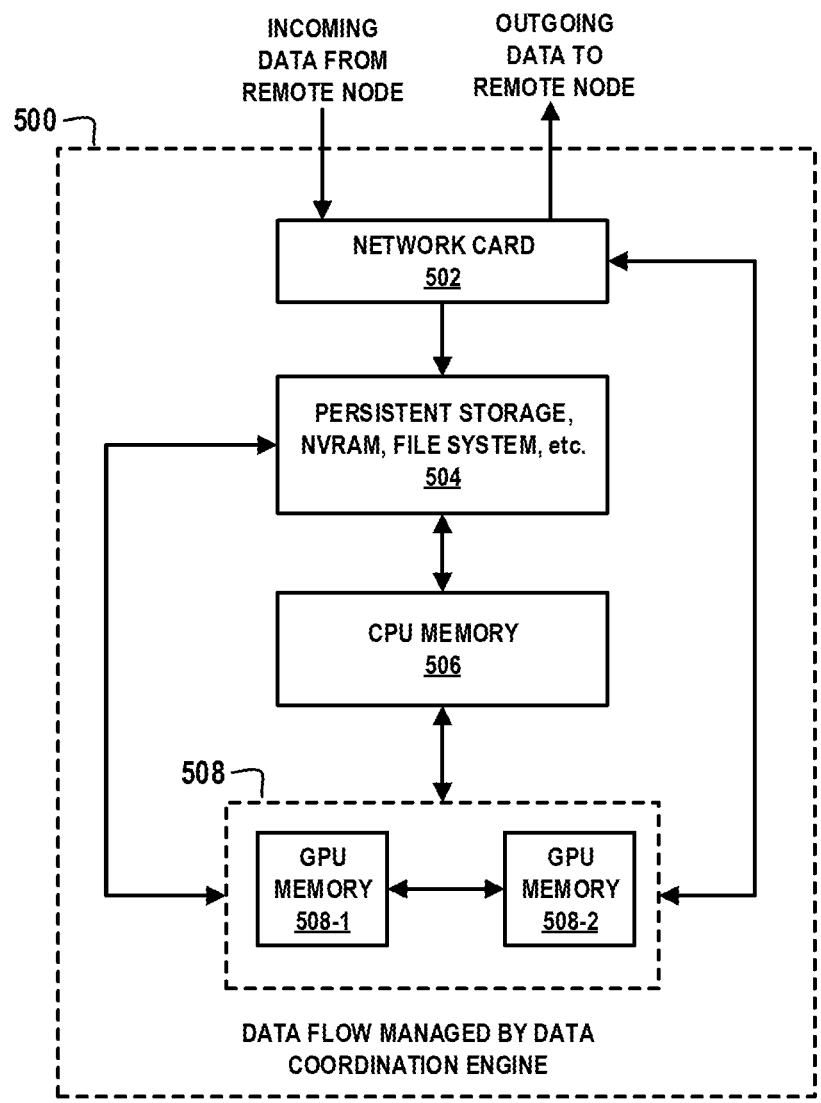
FIG. 5 schematically illustrates various inter-node and intra-node data flows that can be managed by a data coordination engine, according to an embodiment of the invention.

FIG. 5 schematically illustrates various inter-node and intra-node data flows 500 that can be managed by a data coordination engine, according to an embodiment of the invention. More specifically, FIG. 5 illustrates various computing/memory/networking resources located on a given worker server node including, for example, a network card 502, a persistent storage device 504 (e.g., HDD, NVRAM, file system, etc.), a CPU memory 506, and GPU devices 508 comprising GPU memories 508-1 and 508-2 of two different GPU devices, wherein the resources can be connected using dedicated PCIe busses. FIG. 5 schematically illustrates different data flows that can be managed by a data coordination engine in an embodiment in which GPU devices serve as the computing core engine for an accelerated computing job. A typical process flow involving a CPU and GPU can include, for example, (i) loading data from main memory to GPU memory, (ii) the CPU directing the GPU to commence processing of the data, (iii) the GPU executing the data in parallel in two or more GPU cores, (iv) the GPU storing the processing results in the GPU memory, and (v) transferring the processing results from the GPU memory to the main memory.

In the example embodiment of FIG. 5, the network card 502 on the given node receives incoming data which is transmitted from a remote node over a network, and transmits data over the network to a remote node. In one embodiment of the invention, the network card 502 implements RDMA for transmitting and receiving data to and from a remote node over the network. The incoming data from a remote node can be managed by the data coordination engine in a coordinated pipeline fashion wherein, for example, the incoming data can be initially staged in the persistent storage device 504 (e.g., in a NVRAM device) in circumstances in which a current amount of available CPU memory 506 and/or GPU memory 508-1 and 508-2 is limited. The data coordination engine can coordinate the data movement of the staged data from the persistent storage device 504 (e.g., NVRAM) to either the CPU memory 506 or the GPU memory 508-1 and/or 508-2 using DMA operations that are supported by specific DMA drivers or software libraries such as GPUDirect, etc. In addition, data transfers between the GPU memories 508-1 and 508-2 of the GPU devices 508 can be performed using DMA methods (e.g., GPUDirect driver).

As further shown in FIG. 5, the data coordination engine can intelligently coordinate the data transfers between the CPU memory 506 and the GPU memories 508-1 and 508-2, e.g., transferring data generated by the CPU into the GPU memories, or transferring data generated by the GPU devices 508 into the CPU memory 506. For example, the data coordination engine can perform various operations including, but not limited to, explicitly specifying a preferred location (CPU memory or GPU memory) for frequent access to certain data, proactively creating a memory mapping (to avoid page fault), or maintaining a RO (read only) copy (depending on access pattern), migrating data asynchronously in the background in a way that may bypass the CPU via a pinned system memory, and DMA (or RDMA) peer-to-peer transfer of data from a GPU to host memory without the involvement of the CPU, etc. In another embodiment, a CUDA Unified Memory framework can be implemented to create a pool of managed memory that is shared between the CPU and GPU, wherein the managed memory is accessible to both the CPU and GPU using a single pointer. This framework provides a single memory pointer with auto-paging fault capability and explicit migration.

Accordingly, to reiterate aspects discussed above, a data coordination engine according to an embodiment of the invention is configured to intelligently coordinate data communication both intra-node and inter-node. The data coordination engine will coordinate data flow between local GPU devices, between local GPU and CPU devices, and between GPU and memory devices, for example, or coordinate inter-node data flow between computing and storage resources on different nodes. The data coordination engine can intelligently coordinate, e.g., data prefetch operations, batch loading, asynchronous loading, pipeline execution/ loading, etc., based on queue approach and/or the knowledge base. The data coordination engine can optimize pipeline computing and data feeding/exchanging between local resources, as well as asynchronous task execution and parallelism, etc. The data coordination engine can maximize overall node-wide system performance when executing multiple concurrent tasks using a request queue and resource statistics. The data coordination engine can implement methods to profile data locality and model weights locality either by offline processing (e.g., for widely used common deep learning networks) or pilot-run processing of user specified deep learning networks, to thereby learn data feeding/exchanging patterns, and optimize weight loading and weight group updating. The data coordination engine methods are transparent to the executing tasks and do not require any changes to the application code.

It is to be understood that intelligent data coordination techniques can be implemented in other accelerated computing systems. For example, the intelligent data coordination engine and associated methods as discussed herein can be implemented as part of a data plane in a GPU-as-a Service-platform, to coordinate data flow between shared GPU resources within the service platform that offers accelerated computing for machine learning or other compute intensive applications. Moreover, as noted above, a data coordination engine and associated knowledge base can be used to implement a Deep Learning-as-a-Service (DLaaS) platform, wherein the data coordination engine and knowledge base can be packaged together as a well-tuned deep learning service to optimize both offline training and online inference, and then be deployed in the cloud as a DLaaS or implemented as a hyper-converged solution.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
performing an offline process which comprises:
  executing a task;
  determining data flow patterns which occur between resources as a result of data flow operations that are performed during the execution of the task; and
  storing the determined data flow patterns in a knowledge base;
executing the task on a first computing node;
monitoring requests issued by the executing task;
intercepting requests issued by the executing task which correspond to data flow operations to be performed as part of the task execution, wherein the intercepted requests comprise at least one of requests for prefetching data from a memory, requests for loading data into a memory, requests for copying data from a first memory to a second memory, and requests for communicating data to a second computing node; and
asynchronously executing the intercepted requests at scheduled times to coordinate intra-node data flow between resources on the first computing node and inter-node data flow between resources on the first computing node and the second computing node, wherein asynchronously executing the intercepted requests at scheduled times comprises:
  enqueuing the intercepted requests;
  utilizing the determined data flow patterns in the knowledge base to schedule times for executing the enqueued requests in a manner which coordinates intra-node data flow between resources on the first computing node and inter-node data flow between resources on the first computing node and the second computing node; and
  dispatching a given enqueued request for execution by an asynchronous background thread according to a scheduled time for the given enqueued request.

2. The method of claim 1, wherein monitoring requests issued by the executing task comprises monitoring requests issued by the executing task to a software library and an application programming interface.

3. The method of claim 1, wherein the intercepted requests comprise memory allocation requests.

4. The method of claim 1, wherein asynchronously executing the intercepted requests at scheduled times further comprises:
scheduling the times to execute the intercepted requests based on contextual information associated with the intercepted requests and resource usage on at least one of the first computing node and the second computing node.

5. The method of claim 1, wherein asynchronously executing the intercepted requests at scheduled times further comprises:
scheduling the times to execute the intercepted requests based on data flow patterns associated with the task, which are determined by performing a pilot run of the task.

6. The method of claim 1, wherein the executing task comprises a machine learning task for training a machine learning model of a given type, and wherein the offline process is configured to (i) profile at least one of data locality and model parameters locality associated with the training of the machine learning model of the given type, and (ii) utilize at least one of the profiled data locality and the profiled model parameters locality to determine data flow patterns associated with the training of the machine learning model of the given type.

7. The method of claim 1, wherein the intercepted requests comprise requests for copying data from a first memory of a first processor device to a second memory of a second processor device.

8. An article of manufacture comprising a processor-readable storage medium having stored program code of one or more software programs, wherein the program code is executable by one or more processors to implement method steps comprising:
performing an offline process which comprises:
  executing a task;
  determining data flow patterns which occur between resources as a result of data flow operations that are performed during the execution of the task; and
  storing the determined data flow patterns in a knowledge base;
executing the task on a first computing node;
monitoring requests issued by the executing task;
intercepting requests issued by the executing task which correspond to data flow operations to be performed as part of the task execution, wherein the intercepted requests comprise at least one of requests for prefetching data from a memory, requests for loading data into a memory, requests for copying data from a first memory to a second memory, and requests for communicating data to a second computing node; and
asynchronously executing the intercepted requests at scheduled times to coordinate intra-node data flow between resources on the first computing node and inter-node data flow between resources on the first computing node and the second computing node, wherein asynchronously executing the intercepted requests at scheduled times comprises:
  enqueuing the intercepted requests;
  utilizing the determined data flow patterns in the knowledge base to schedule times for executing the enqueued requests in a manner which coordinates intra-node data flow between resources on the first computing node and inter-node data flow between resources on the first computing node and the second computing node; and dispatching a given enqueued request for execution by an asynchronous background thread according to a scheduled time for the given enqueued request.

9. The article of manufacture of claim 8, wherein monitoring requests issued by the executing task comprises monitoring requests issued by the executing task to a software library and an application programming interface.

10. The article of manufacture of claim 8, wherein the intercepted requests comprise memory allocation requests.

11. The article of manufacture of claim 8, wherein asynchronously executing the intercepted requests at scheduled times further comprises:
scheduling the times to execute the intercepted requests based on contextual information associated with the intercepted requests and resource usage on at least one of the first computing node and the second computing node.

12. The article of manufacture of claim 8, wherein asynchronously executing the intercepted requests at scheduled times further comprises:
scheduling the times to execute the intercepted requests based on data flow patterns associated with the task, which are determined by performing a pilot run of the task.

13. The article of manufacture of claim 8, wherein the executing task comprises a machine learning task for training a machine learning model of a given type, and wherein the offline process is configured to (i) profile at least one of data locality and model parameters locality associated with the training of the machine learning model of the given type, and (ii) utilize at least one of the profiled data locality and the profiled model parameters locality to determine data flow patterns associated with the training of the machine learning model of the given type.

14. The article of manufacture of claim 8, wherein the intercepted requests comprise requests for copying data from a first memory of a first processor device to a second memory of a second processor device.

15. A system, comprising:
a memory configured to store program instruction; and
at least one processor configured to execute the stored program instructions to perform a method comprising:
performing an offline process which comprises:
executing a task;
determining data flow patterns which occur between resources as a result of data flow operations that are performed during the execution of the task; and
storing the determined data flow patterns in a knowledge base;
executing the task on a first computing node;
monitoring requests issued by the executing task;
intercepting requests issued by the executing task which correspond to data flow operations to be performed as part of the task execution, wherein the intercepted requests comprise at least one of requests for prefetching data from a memory, requests for loading data into a memory, requests for copying data from a first memory to a second memory, and requests for communicating data to a second computing node; and
asynchronously executing the intercepted requests at scheduled times to coordinate intra-node data flow between resources on the first computing node and inter-node data flow between resources on the first computing node and the second computing node, wherein asynchronously executing the intercepted requests at scheduled times comprises:
enqueuing the intercepted requests;
utilizing the determined data flow patterns in the knowledge base to schedule times for executing the enqueued requests in a manner which coordinates intra-node data flow between resources on the first computing node and inter-node data flow between resources on the first computing node and the second computing node; and
dispatching a given enqueued request for execution by an asynchronous background thread according to a scheduled time for the given enqueued request.

16. The system of claim 15, wherein monitoring requests issued by the executing task comprises monitoring requests issued by the executing task to a software library and an application programming interface.

17. The system of claim 15, wherein the intercepted requests comprise memory allocation requests.

18. The system of claim 15, wherein asynchronously executing the intercepted requests at scheduled times further comprises:
scheduling the times to execute the intercepted requests based on contextual information associated with the intercepted requests and resource usage on at least one of the first computing node and the second computing node.

19. The system of claim 15, wherein asynchronously executing the intercepted requests at scheduled times further comprises:
scheduling the times to execute the intercepted requests based on data flow patterns associated with the task, which are determined by performing a pilot run of the task.

20. The system of claim 15, wherein the executing task comprises a machine learning task for training a machine learning model of a given type, and wherein the offline process is configured to (i) profile at least one of data locality and model parameters locality associated with the training of the machine learning model of the given type, and (ii) utilize at least one of the profiled data locality and the profiled model parameters locality to determine data flow patterns associated with the training of the machine learning model of the given type.

* * * * *